United States Patent [19]

Hannebauer et al.

[11] Patent Number: 5,841,807
[45] Date of Patent: Nov. 24, 1998

[54] SPREAD SPECTRUM DATA COMMUNICATOR

[75] Inventors: Robert S. Hannebauer; Sean C. Carroll; Xu Tan, all of Vancouver, Canada

[73] Assignee: Intracoastal System Engineering Corporation, Burnaby, Canada

[21] Appl. No.: 604,095

[22] Filed: Feb. 20, 1996

[30] Foreign Application Priority Data

Jul. 20, 1995 [CA] Canada ................................. 2,154,298

[51] Int. Cl.⁶ .................................................. H04B 1/707
[52] U.S. Cl. .......................... 375/206; 375/200; 375/905; 455/500; 455/91
[58] Field of Search ...................... 375/206, 200, 375/202, 205, 207, 208, 295, 316, 367; 455/500, 91, 102, 103; 370/342, 320, 441, 479, 335

[56] References Cited

U.S. PATENT DOCUMENTS

| | | | |
|---|---|---|---|
| 3,914,757 | 10/1975 | Finlay, Jr. et al. | 340/310 A |
| 4,307,380 | 12/1981 | Gander | 340/310 R |
| 4,763,103 | 8/1988 | Galula et al. | 340/310 R |
| 4,815,106 | 3/1989 | Propp et al. | 375/36 |
| 4,841,545 | 6/1989 | Endo et al. | 375/200 |
| 4,864,589 | 9/1989 | Endo | 375/200 |
| 5,185,591 | 2/1993 | Shuey | 340/310 A |
| 5,278,862 | 1/1994 | Vander Mey | 375/200 |
| 5,280,498 | 1/1994 | Tymes et al. | 375/200 |
| 5,280,537 | 1/1994 | Sugiyama et al. | 375/200 |
| 5,353,307 | 10/1994 | Lester et al. | 375/206 |
| 5,357,541 | 10/1994 | Cowart | 375/1 |
| 5,661,750 | 8/1997 | Fulton | 375/206 |
| 5,668,828 | 9/1997 | Sanderford, Jr. et al. | 375/202 |
| 5,689,526 | 11/1997 | Slonneger et al. | 375/206 |

*Primary Examiner*—Wellington Chin
*Assistant Examiner*—Congvan Tran
*Attorney, Agent, or Firm*—Chernoff, Vilhauer, McClung & Stenzel

[57] ABSTRACT

In summary, the spread spectrum direct sequence communication system of the present invention has a plurality of transmitters for uni-directionally simultaneously transmitting, through a transmission medium to a single receiver, a plurality of data streams. Each transmitter transmits a single data stream. Each data stream comprises a plurality of direct sequence data packets. Each transmitter has a data collector, a data formatter, a transmission device, a transmission interface, and a power supply.

17 Claims, 19 Drawing Sheets

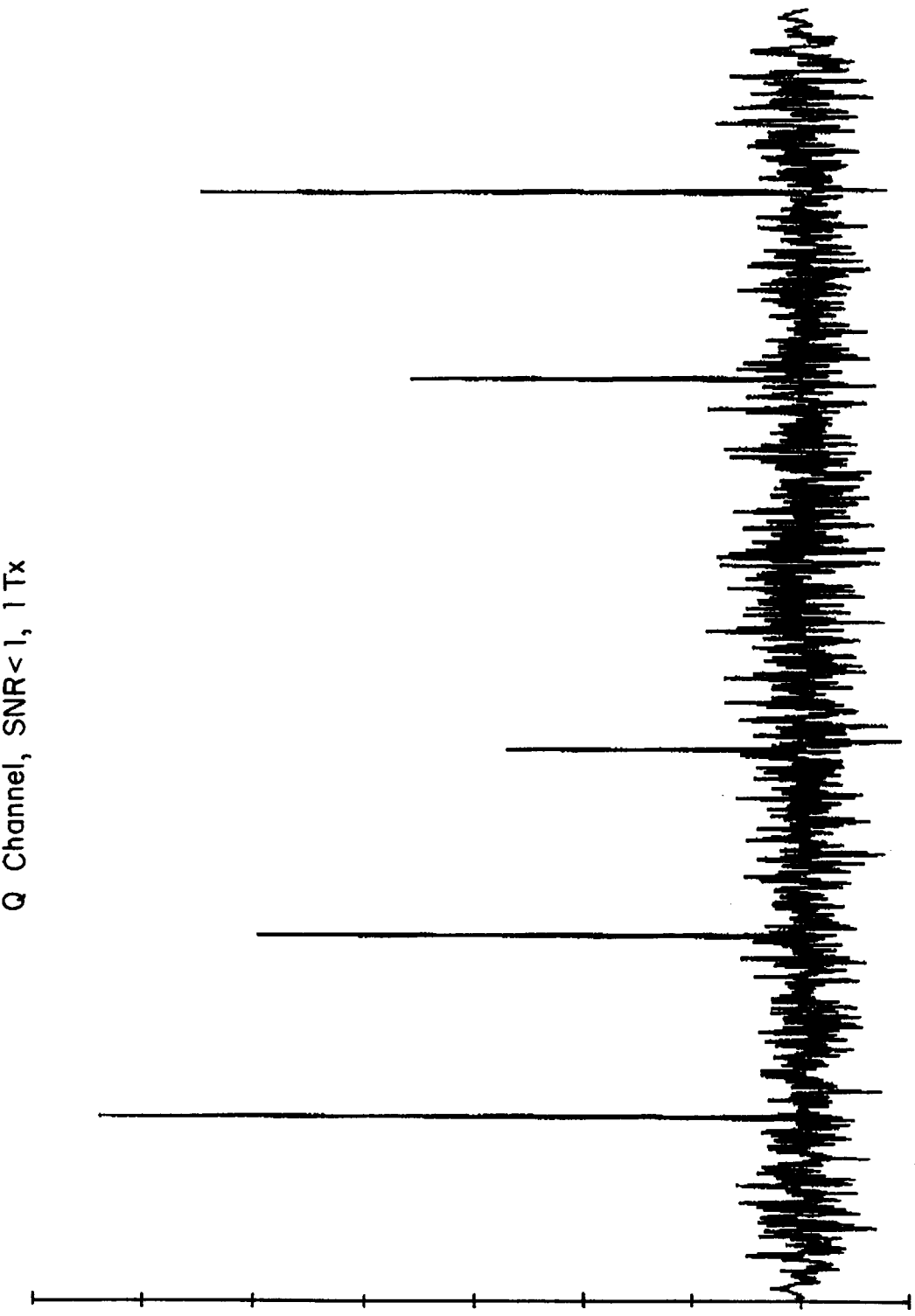

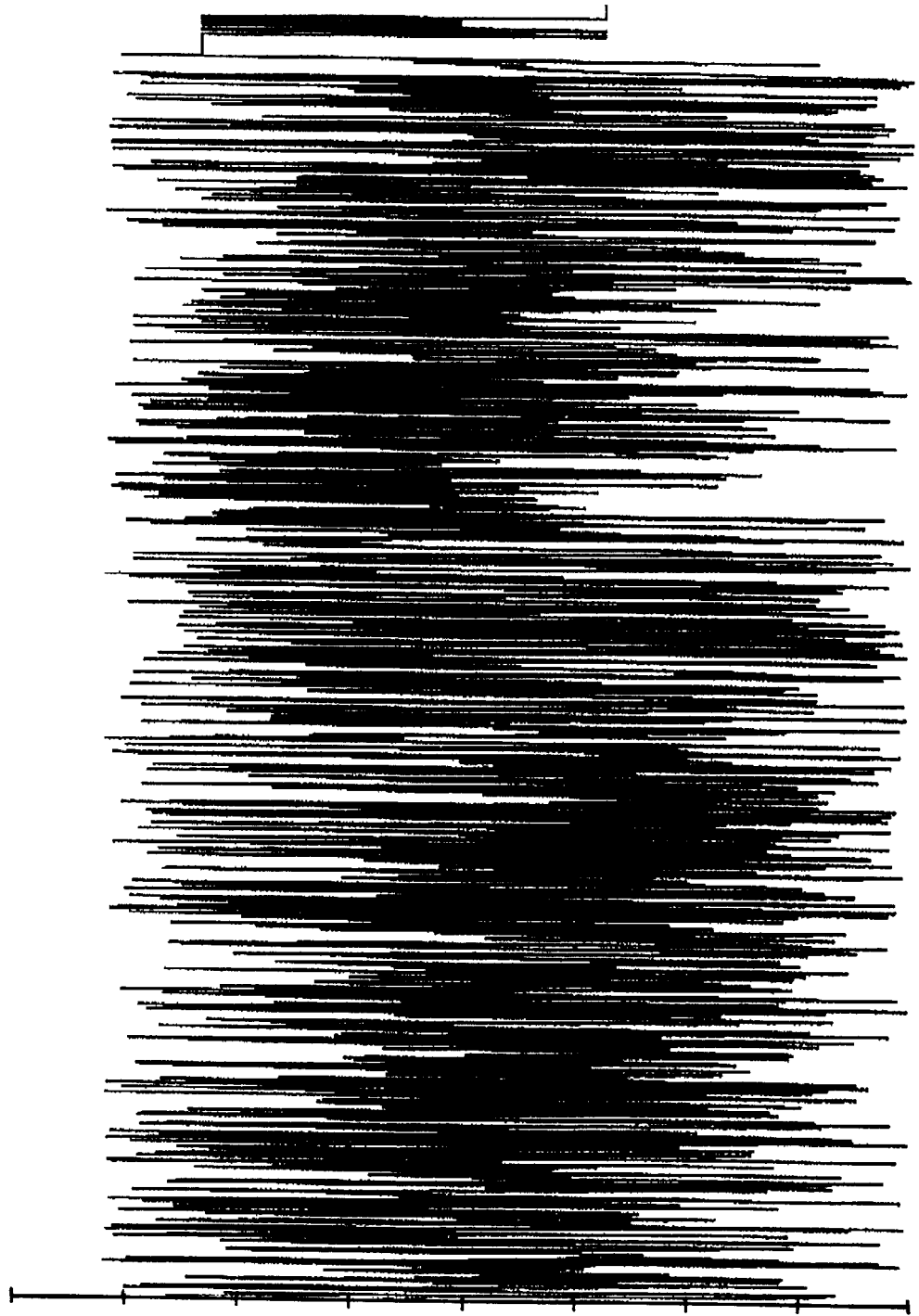

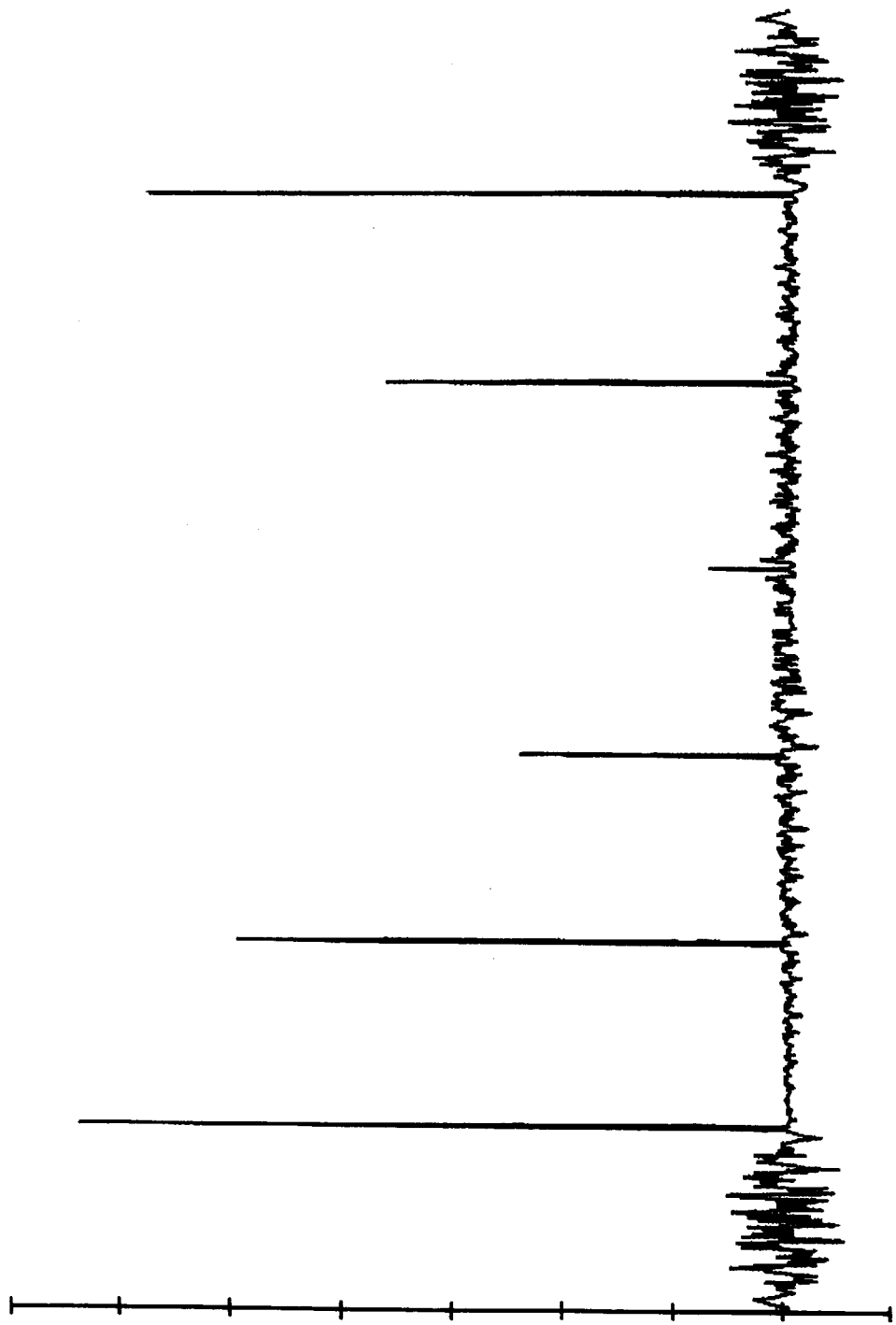

SPREAD SPECTRUM DATA COMMUNICATOR

FIELD OF THE INVENTION

The present invention relates to the field of spread spectrum data communications and, in particular, to simultaneous spread spectrum data communication in a high noise and signal attenuation environment between a plurality of simultaneously transmitting transmitters and a single simultaneously receiving receiver.

BACKGROUND OF THE INVENTION

Data communications in electrically noisy and highly attenuating environments such as applications in power line communications is difficult. Reliable communications in such an environment becomes increasingly difficult if it is an object, such as here, to provide simple low powered transmitters such as might result if the transmitter is battery powered, or where the transmitters are simultaneously transmitting in an electrically noisy and highly attenuating environment to a single receiver.

Applicant's experience with power line communications equipment indicates that to effect reliable communications in such an environment, the communication system must be able to overcome a combined noise and attenuation deficit of greater than 75 to 80 db. One technique known in the prior art is to merely provide a signal that will always maintain a given signal to noise ratio regardless of the noise or attenuation present. However, in the case of power line communications, the noise signals and attenuation present are very large and thus the transmitter and power supply operating on this principal would become very large and expensive. Where the transmitter is a conventional low power transmitter, the transmitted signal will not overcome the noise level and signal attenuation found in power line communications. This is especially true for low powered radio frequency data collecting equipment where the data collecting equipment transmits a data stream via power line communications.

In power line communications, signal attenuation arises from the inherent design of the electrical grid and the need to deliver electrical power to the utility user. The attenuation in an electrical grid will vary with frequency, time and position on the grid. Commutating and chopping style equipment, for example, motors, switching power supplies and SCR's (Silicon Controlled Rectifier's, such as those used in light dimmers) create time variable loading and impedance modulation of the power lines that change unpredictably within the time frame of one cycle of the power mains frequency. Additionally, equipment is turned on and off, thereby changing the loading on the power line on a longer time frame, that is, at a frequency much lower than that of the power mains frequency. Highly inductive equipment, for example motors, attenuate the communications channel at lower frequencies, whereas capacitive equipment, for example fluorescent light ballast and capacitor banks, attenuate the communications channel at higher frequency. Individual equipment that is attached to the power lines will have variable and complex frequency characteristics. Because of the distributed impedance that the power grid system and all of the attached loads present, the attenuation varies with position within the network. A common artifact of this distributed impedance is the presence of nodes, whereby, for a given frequency, there are locations where a given frequency is greatly attenuated.

Electrical noise that arises from commutating equipment, for example motor loads, and chopping style equipment, for example SCR's and switching power supplies, is very often pulse-like in nature. As such, the noise is very broad band and time variable and can often appear to the communications channel to be a very large electrical signal jamming source, additional noise sources come from conducted emissions from attached equipment and also from natural sources such as lightning, etc.

In the prior art, applicant is aware of U.S. Pat. No. 3,914,757 which issued to Finlay et al. Finlay et al describes a power line communication system that employs a multiplicity of inexpensive transmitters distributed around a multiplicity of receivers located at a single site. This system exploits the cost benefits of multiple inexpensive transmitters, however requires a multiplicity of receivers.

U.S. Pat. No. 4,307,380 which issued to Gander, describes a power line communication system that utilizes frequency diversity for communication, whereby a signal representing data or intelligence is used to control a transmitter to effect chirp modulation of that signal. In a high attenuation or in a broad band noise environment, the Gander system will fail as compared to the relative immunity to attenuation and noise of the communication system of the present invention. This is because there is no process gain in the system and the system requires that any noise sources that are present are only present for an interval of time that is substantially less than the sweep time of the signal.

U.S. Pat. No. 4,763,103 which issued to Galula et al, recognizes the importance of both attenuation performance and anti-jamming noise performance of a power line communication system, and attempt to solve the problem by implementing a wide band power line communication system. The system employs frequency hopping as the basic approach to frequency diversity and employs rudimentary process gain by means of multiple frequency hops per data bit to help minimize the effects of noise and attenuation. Because of the limited process gain and limited frequency diversity at a given time in the transmission of a bit of information, this system is inadequate in noisy or attenuated environments.

U.S. Pat. No. 4,815,106 which issued to Propp et al teaches a power line communication system that is a spread spectrum communication system having a relatively uniform frequency distribution of transmission, and that uses an adaptive filtering technique in the receiver to aid in the detection of the transmitted signals. Propp et al, by limiting themselves to a relatively uniform spectrum minimize the available process gain inherent in a direct sequence spread spectrum technique in that they cannot use waveform patterns that are optimized for the correlation detection process as optimized in the system of the present invention. What is taught by Propp et al is a power line communication system that employs a direct sequence non-pseudo noise spread spectrum transmitter and receiver of limited chip length. Adaptive filtering of the received signal is used to correct for distortions caused by the channel. Transmission is adaptively controlled to pre-correct for the channel characteristics. The system suffers from limited process gain in that process gain is lost through the use of non-optimal codes, and although the waveforms transmitted may have frequency spreading characteristics, they are not matched for maximized detection. The adaptive channel technique does not improve the systems performance in very noisy environments as the noise signal is shaped along with the desired signal. As disclosed, the system does not have the ability to receive multiple sub-channels.

U.S. Pat. No. 5,185,591 which issued to Shuey describes a power line communications system having frequency diversity by employing a multiplicity of carrier frequencies. In other words, a plurality of transmission carriers carry the same data signal. The teaching is directed toward resisting attenuation nodes in the network. What is not taught is the use of process gain in a spread spectrum communication system, in other words, the processing gain is inadequate to get around attenuation and jamming.

U.S. Pat. No. 5,357,541 for the invention of Cowart discloses a transceiver used in spread spectrum pseudo noise direct sequence power line communications system. The transceiver generates a carrier, pseudo noise code, and serially shifts data out, all from a common clock. The frequency of the transmitted carrier and the local double side band demodulation signals are constrained to be close enough in frequency to allow a digital variant of an analog Phase Locked Loop to be implemented through a technique called bit stuffing. Other than this digital variation the techniques described are classical SS-DS techniques. The receiver actively tracks the incoming message and eliminates the beat frequency created from the transmitter clock frequency mismatch with the receiver clock frequency. Thus, what is taught is a spread spectrum direct sequence transceiver that employs pseudo noise Bi-Phase Shift Keying (BPSK) modulation in the transmitter and an analog correlator in the receiver. The system is optimized as a transceiver for receiving data from one data transmitting unit at a time. What is neither taught nor suggested is the use of a single receiver simultaneously receiving multiple data stream signals and optimization for such in order to capture such data streams.

Thus it is an object of the present invention to provide spread spectrum direct sequence power line communications whereby simultaneous capture of multiple data-streams by a single receiver is effective in a system having a plurality of simple inexpensive spread spectrum direct sequence transmitters transmitting to a single spread spectrum direct sequence receiver to form a plurality of unidirectional data links from the transmitters to the receiver. It is a further object of the present invention to provide a communication technique well suited to communication channels that have a high degree of noise or jamming sources, or high attenuation or high multipath interference or attenuation nodes.

SUMMARY OF THE INVENTION

In summary, the spread spectrum direct sequence communication system of the present invention has a plurality of transmitters for uni-directionally simultaneously transmitting, through a transmission medium to a single receiver, a plurality of data streams. Each transmitter transmits a single data stream. Each data stream comprises a plurality of direct sequence data packets. Each transmitter has a data collector, a data formatter, a transmission device, a transmission interface, and a power supply.

The data collector collects data and passes the data to the data formatter. The data formatter formats the data into a serial data packet having a preamble, a transmitter identity and the data. The data formatter serially shifts the data packet into the transmission device.

The transmission device XORs the data packet with a fixed length, repeated pseudo random noise digital chip sequence (otherwise referred to herein as a PN sequence or pseudo noise sequence) at a first clock frequency. The resulting pseudo noise signal is modulated with a carrier to a carrier centre frequency.

The transmission interface transmits the resulting carrier modulated pseudo noise signal containing the data packets as the data stream from the transmission device of each transmitter into the transmission medium, whereby the data is transmitted at a constant data rate.

The signal receiver has a linear front end and operates at a second clock frequency. A carrier demodulator simultaneously demodulates the carrier modulated pseudo noise signals containing the data packets. The receiver also includes means for simultaneous detection of the pseudo noise signals, means for simultaneous correlation of the pseudo noise signals with a replica of the pseudo noise signal, means for simultaneous reconstruction of the data packets, and means from stripping the data from the data packets once reconstructed.

When there is a difference between said first clock frequency and the second clock frequency, the means for reconstruction of the data packets includes means for compensating for the difference between the first clock frequency and the second clock frequency.

Advantageously, the fixed length, repeated pseudo random noise digital chip sequence is a hierarchical pseudo noise bit sequence generated by a plurality of hierarchical pseudo noise generators whose respective output of shorter pseudo noise sequences are XOR'd, whereby the PN sequence is formed as a hierarchy of the shorter pseudo noise sequences.

The plurality of hierarchical pseudo noise generators may be two PN generators where the first PN generator is of length L and a PN sequence of length $2^L-1$, at a first clock rate and the second PN generator is of length K and emits a PN sequence of $2^K-1$ at a second clock rate, and wherein the second clock rate is $1/(2^L-1)$ the first clock rate.

In order to maximize the process gain for the PN sequence, the data rate is set equal to the repeat rate of the PN sequence.

Further advantageously, the means for simultaneous correlation of said pseudo noise signals with a replica of the pseudo noise signal over-samples the pseudo noise signals. Such over-sampling may be three times over-sampling. Further, the means for simultaneous correlation of the pseudo noise signals with a replica of the pseudo noise signal includes means for performing inner product calculations on the data streams.

Simultaneous capture of the data streams from the transmitters may be accomplished where each of the data streams is separated in phase, and the means for simultaneous correlation of the pseudo noise signals with a replica of the pseudo noise signal correlates waveform shape and phase of the data streams with waveform shape and phase of the replica of the pseudo noise signal and generates an indicative output upon a matching correlation.

BRIEF DESCRIPTION OF THE DRAWINGS

FIGS. 6a–6d are plots of the various waveforms associated with the reception process. FIG. 6a is an I channel correlational filter output. FIG. 6b is a Q channel correlational filter output. FIG. 6c is the magnitude of the I & Q channel output. FIG. 6d is the phase of the I & Q channel output.

FIGS. 8a–8d are respectively, the I channel, Q channel, magnitude and phase plots of FIGS. 6a–6d resultant of the simultaneous correlational detection of two PN sequences.

FIGS. 10a–10d are, respectively, the I channel, Q channel, magnitude and phase plots of FIGS. 6a–6d resultant of a theoretically generated PN sequence, with a signal to noise ratio of 80 db. and with a phase or bit transition between correlational spikes "B" and "C".

DETAILED DESCRIPTION OF THE PREFERRED EMBODIMENT

A direct sequence pseudo noise spread spectrum bi-phase shift keying communications technique uses a pseudo noise generator to modulate the data signal, the signal is then up-converted to a centre frequency of the band. The receiver for such a system uses a correlator for detection of the pseudo noise generated patterns to ensure capture capabilities in reception.

Figure 1:
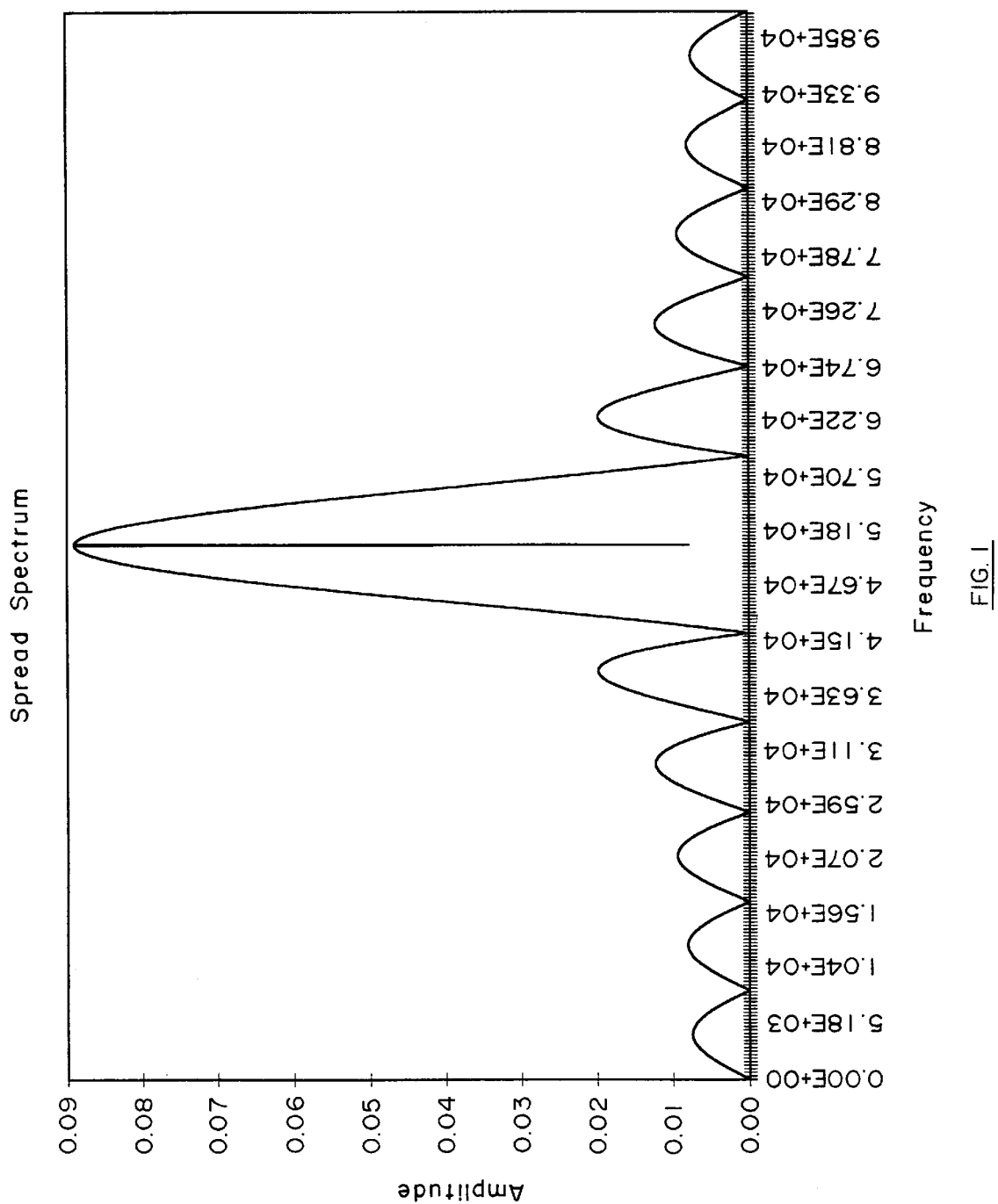
FIG. 1 illustrates the frequency envelope of pseudo noise (PN) direct sequence spread spectrum signals with center frequency of 50 Khz, a pseudo noise generator of 7 bits and a data transmission rate of 65.6168 bits/sec.

FIG. 1 illustrates a frequency envelope of a direct sequence spread spectrum signal with a centre frequency of 50 Khz, a pseudo noise length of 127 bits and a data transmission rate of 65.6168 bits per second.

Figure 2:
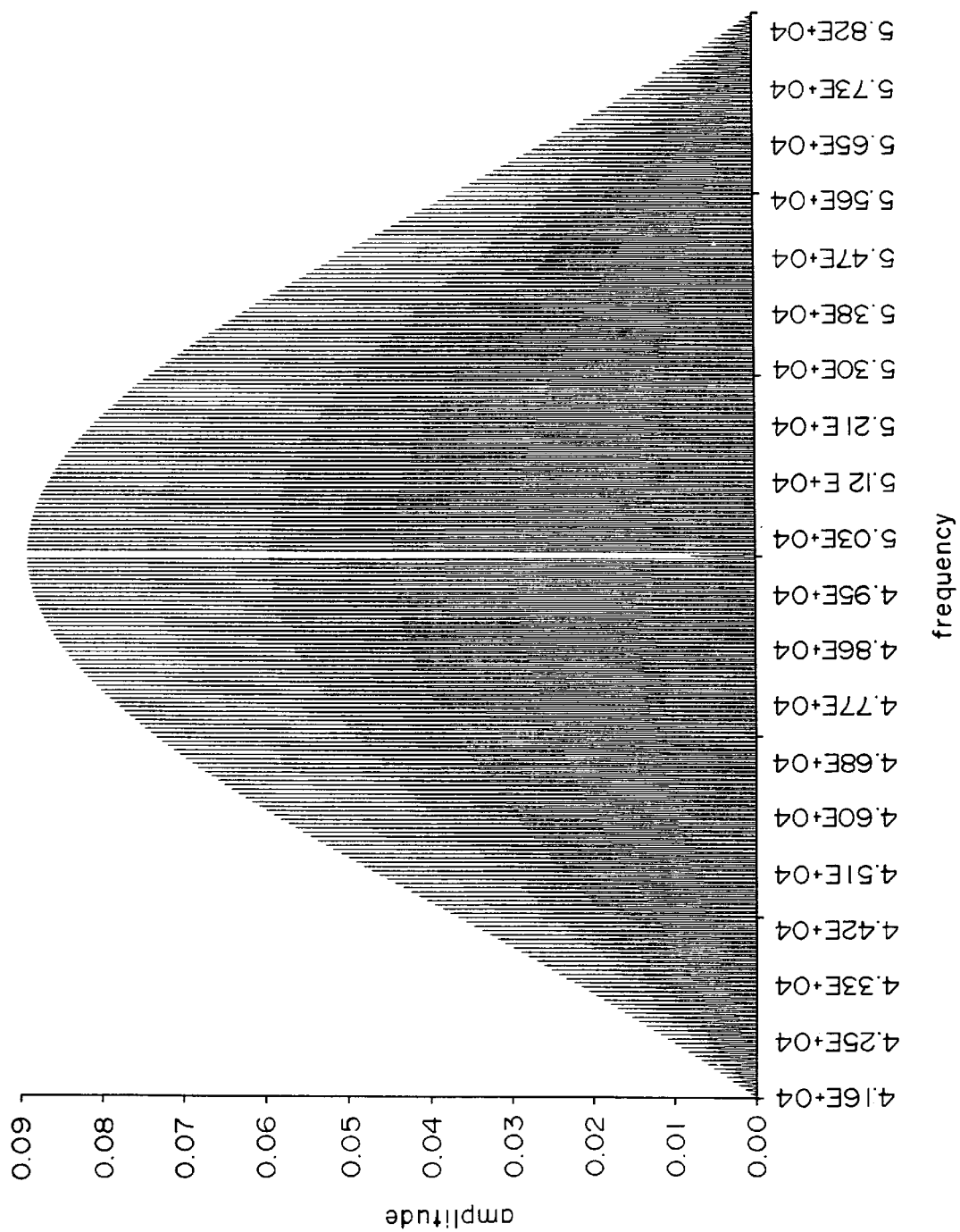
FIG. 2 illustrates the detailed comb structure of the central lobe of FIG. 1 on an expanded scale from 41.666 Khz to 58.333 Khz.

FIG. 2 illustrates the comb structure, illustrated at spaced intervals of 65.61 hertz, of the central lobe of the direct sequence spread spectrum signal illustrated in FIG. 1. In this manner, a spread spectrum communication system spreads the data being transmitted over a much larger band width than that required as a minimum for the data transmission rate. This technique is unlike traditional transmission techniques in that detection is performed by matching the waveform shape rather than just the frequency, amplitude or phase characteristics of the signal. Only signals that have the required matching pseudo noise pattern will be detected by the receiver. This is due to the nature of the correlational detector and the selection of the transmitted waveform to optimize the detection. The correlation Integral can be described mathematically as:

$$C(t) = \int S(t-\Im)P(t)d\Im$$

where P(t) is the Pseudo-noise pattern, S(t) is the incoming signal, $\Im$ is the integration variable, t is time and C(t) is known as a correlation integral. For the case when S(t)=P(t) the output from this integral is a delta function, thus P(t) is said to belong to the class of functions that autocorrelate. If S(t) is any analytic function other than P(t) the response C(t) will not be a delta function. Through this capability, the correlational style detector can separate a particularly coded signal from all others.

To show how such a function can be realized in one form for practical use a discreet time version of this integral over a limited interval can be described $$\text{as } C' = \sum_{n=0}^{N} S_n'(t' - \Im')P_n'(t')$$

where all primed quantities are the discreet time sampled versions of the ones above with N being the sample length and n being the sample number. The discreet time version can be further simplified and generalized via the following process of writing out the equation of C' for each value m of $\Im$.:

For $\Im=0$ the value of C' is:

$$\text{as } C_0' = \sum_{n=0}^{m} S_n'(t')P_n'(t')$$

For $\Im=1$ the value of C' is:

$$C_1' = \sum_{n=1}^{m+1} S_n'(t')P_n'(t')$$

and for the Nth value of $\Im$ the value of C' is:

$$\text{as } C_N' = \sum_{n=N}^{m+N} S_n'(t')P_n'(t')$$

The formulae for calculating each C' is known as the inner product.

Given that $\|S'(t)\|=\|P'(t)\|=1$ when S(t)=P(t) for a given m then $C_m$=m. This style of detection has the advantage of being able to select a given pattern over all others. The value m above is known as the process gain. As can be seen by someone skilled in the art this implementation of a correlation integral is easily reduced to practice in hardware or software with each C'0 value being calculated using an inner product or a multiply accumulate function.

Thus from the above it may be seen that the direct sequence spread spectrum communication system of the present invention uses a plurality of simple spread spectrum direct sequence transmitters transmitting to a single spread spectrum direct sequence receiver through a plurality of uni-directional data links from the transmitters to the receivers. The transmitters are, ideally, transmitters having low transmitted power either in order to meet regulations or because the transmitter is battery powered or because of small size/low cost constraints.

Transmitter

The transmitter is comprised of three sub-systems, namely, the data collection and formatter sub-system, the transmitter section sub-system, and the transmission interface sub-system.

The data collection and formatter sub-system can be implemented in various ways. One example is by means of a microprocessor. Another example is by means of a dedicated integrated circuit. The data collection and formatter sub-system collects data for transmission to the receiver and formats the data into appropriate data packet structures. The data packet is comprised of a preamble, transmitter identity, data being transmitted and, optionally, error detection and correction. In addition, the data collection and formatter sub-system serially shifts the data packet at a fixed rate into the transmitter sub-system. These techniques are common and are represented in many commercially available components.

The transmitter sub-system is a conventional spread spectrum transmitter sub-system. The serial data stream is exclusive "OR"ed (XOR, in the Boolean logic sense) with a pseudo noise signal. Once the serial data stream is XOR'ed with the pseudo noise sequence, it is in turn modulated with a carrier to up-convert the pseudo noise (hereinafter also PN) modulated data to an appropriate centre frequency such as depicted in FIGS. 1 and 2. The up-conversion process is followed by a band-pass filter to reduce undesired frequency components. In standard communication terms, the transmitter may be described as a spread spectrum direct sequence pseudo noise bi-phase shift keying modulator.

Figure 3:
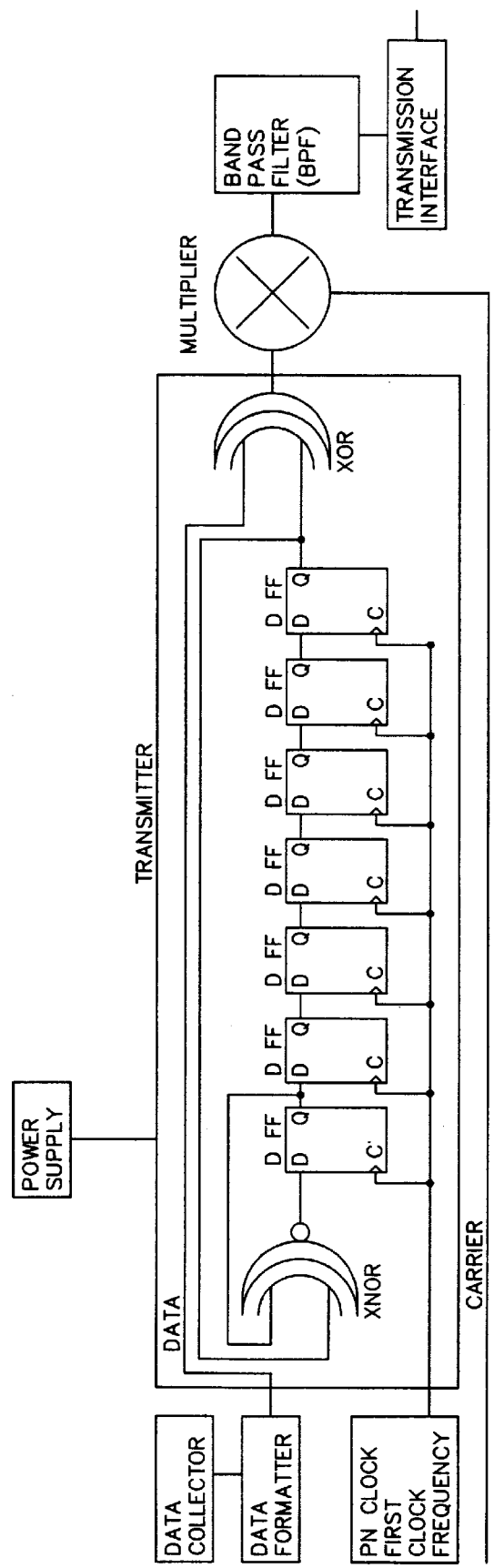
FIG. 3 shows a PN transmitter that digitally modulates the data stream with a PN sequence and then is in turn analog modulated with a carrier signal.

One possible transmitter system is illustrated in FIG. 3 which shows an input serial data stream being XOR modulated with a PN sequence generated by 7 D flip flops and a XNOR gate. This signal is turn modulated with a carrier signal source by an analog modulator and then passed through a band pass filter (labelled BPF).

Figure 4:
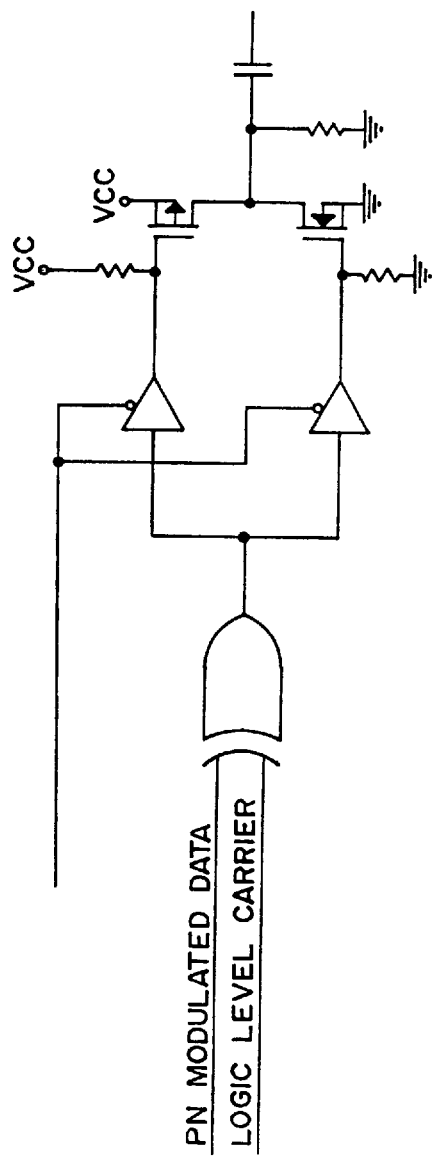
FIG. 4 shows a direct conversion from digital to analog of a PN and carrier modulated signal.

The required transmission interface sub-system is determined by the medium being transmitted into by the transmitter sub-system. In the case of a radio based system, an amplifier and antenna would follow the carrier modulator in the transmitter sub-system. In a power line communication system, one embodiment of the transmitter sub-system carrier modulator is illustrated in FIG. 4. In this embodiment, an XOR gate is used as a carrier modulator. This is because the signals are kept in a digital form up to the last stage of the line coupling interface. This form of transmission has proven to be very cost effective and energy efficient. A characteristic of this method, however, is spurious frequency components due to the switching of the driving Field-Effect Transistor (FET) on the line. However, in the experience of the applicant, a power line communication environment readily removes these spurious frequency components through the excessive stray impedances present in the power line communication environment.

In the particular embodiment shown in FIG. 4, the data rate is chosen to equal the PN generator repeat rate and is run synchronously ie, from a common clock. This maximizes the process gain for a given PN sequence and additionally has only one correlational spike per data bit (hereinafter explained), which simplifies the receiving circuit.

Receiver

Figure 5:
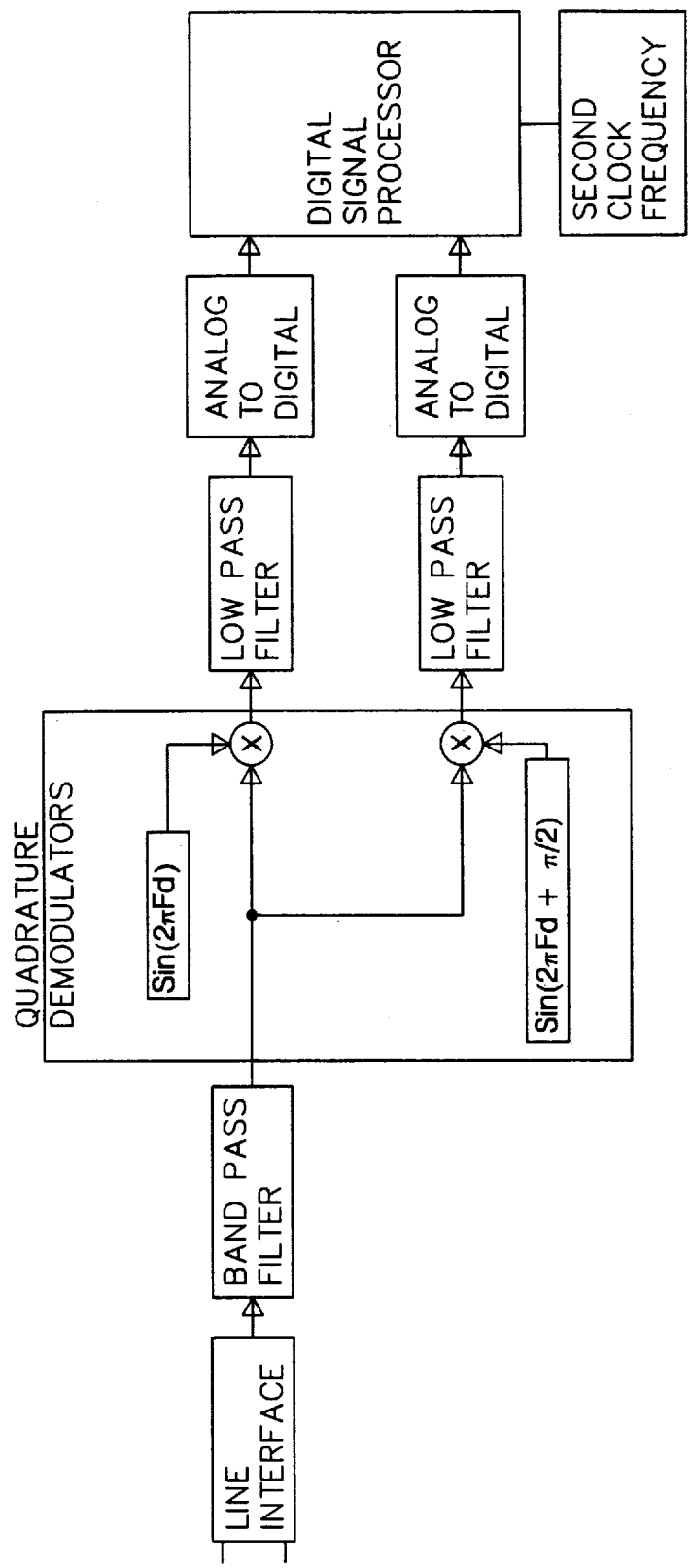
FIG. 5 shows a block diagram of a PN receiver.

The receiver diagrammatically illustrated in FIG. 5 is linear in that no limiting amplifier is used. Some techniques for spread spectrum direct sequence pseudo noise reception, such as tau dither and delay locked loop, do not allow the reception and capture of multiple signals simultaneously by the receiver because of the need for limiting amplifiers etc. The receiver of the present invention can receive from several signal sources simultaneously due to its linear circuitry and the use of correlational detection. The receiver may use standard double side band quadrature demodulation techniques with the I & Q signals associated with such a technique. An analog to digital conversion is done on each of the I & Q channels simultaneously at a rate that is three times higher than the expected pseudo noise chip rate. Implicit in the FIG. 5 diagram is a sample and hold for the incoming demodulated signals. The value of three was merely chosen as being greater than the minimum value of two times over sampling required by Nyquist's sampling theorem and is not so large that the correlational filters become prohibitively expensive. Each correlational filter performs a correlation of the incoming signal with a three times oversampled replica of the pseudo noise sequence internally.

In the block diagram of FIG. 5 the block labelled "line interface" allows for the signal frequency band of interest to enter the circuitry while rejecting the main power line signal. Further, the line interface isolates the circuit from the mains power line and ensures its safety. The block labelled "bandpass filter" provides for rejecting out of band noise and improves signal to noise ratio in so doing.

In the block labelled "quadrature demodulators" quadrature detection is used in which dual demodulators accept as inputs the carrier frequency and a quadrature delayed version of the carrier frequency, that is, conventional double side band demodulation. No attempt is made or required in the communication system of the present invention to lock onto the carrier frequency of the received signal. Thus there is a mismatch in the centre frequencies between the transmitter frequencies and receiver frequencies, thereby causing a beat of the received signals. It is because of the beat of the received signals that quadrature demodulation is employed.

The blocks labelled "low pass filter" designate dual low pass filters to remove unwanted characteristics of the quadrature demodulation. They act as anti-aliasing filters for the analog to digital converters, labelled as the next blocks in the block diagram of FIG. 5. The analog to digital converters should have at least 10 db better resolution than the required performance of the communication system. For example, if the target performance is 70 db, the analog to digital converters must have at least 80 db performance (ie. 14 bit converters). The sampling rate is: $F_s = 3mF_d$, where $F_s$=Sampling Frequency and $F_d$=Data Rate. This ensures at least three samples per chip. Higher rates can be used (such as $F_s = 4mF_d$), but this increases the amount of processing required in the correlator as described below.

The remaining functions of the receiver of FIG. 5 are implemented in software, although for the most part these algorithms easily lend themselves to hardware implementations. The software can be broken down into two parts, namely, detection and data packet reconstruction.

The detection software used in the detector is based upon a correlation detection scheme. With a pseudo noise sequence of length m and 3 times oversampling the correlator has to perform on data of length 3 m. Each sample from the I & Q data streams is inserted into a LIFO (Last in First out) buffer of length 3 m. After the insertion of the each new data sample, (and the subsequent removal of the oldest data point) an inner product is performed on these buffers with a three times oversampled version of the PN sequence. (Each PN sample point is repeated three times). In a physical sense the inner product operation slides over the incoming data stream and emits correlational spikes when the PN sequence copy or replica aligns with a PN sequence in the incoming data stream.

Figure 6A:
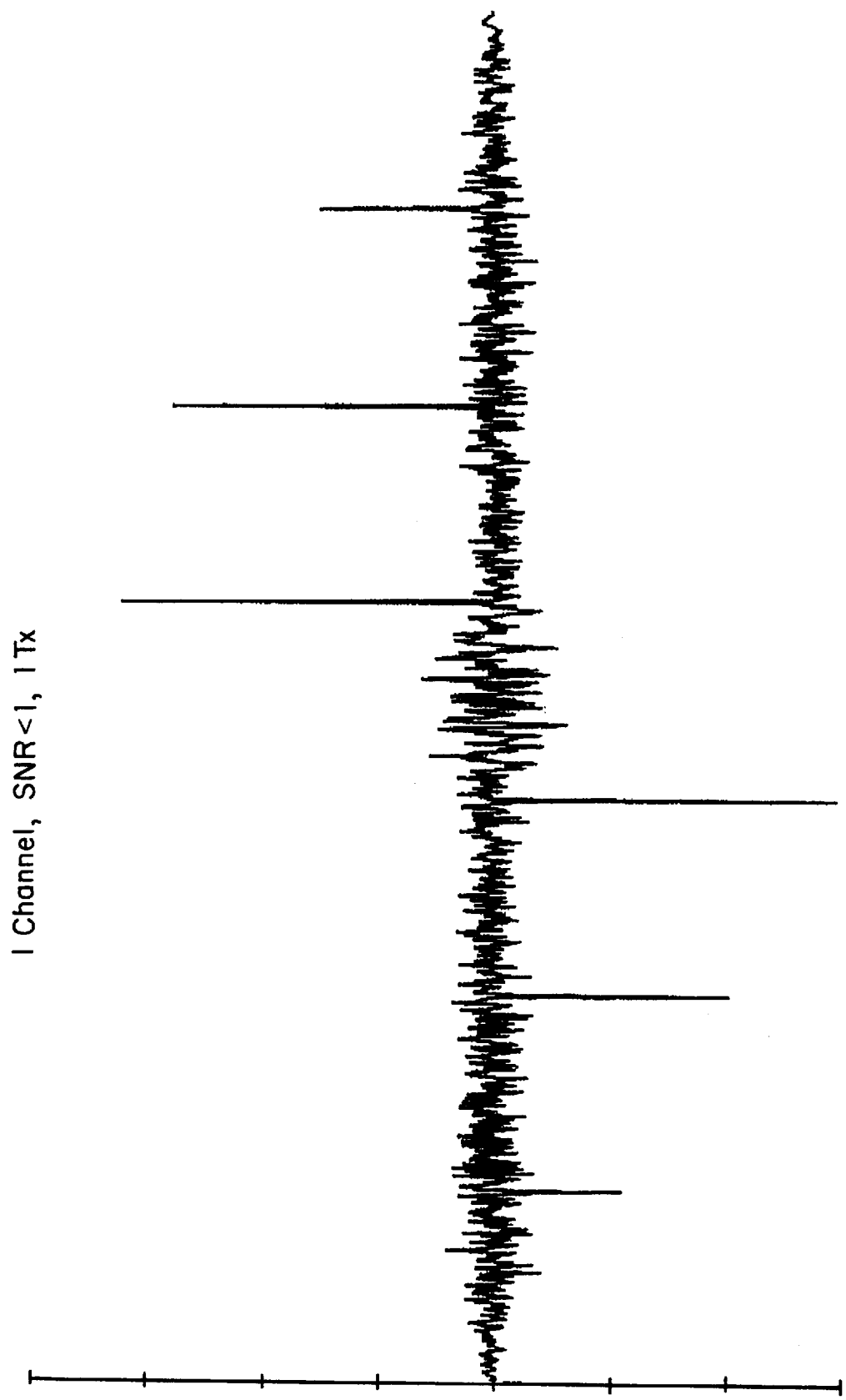
Figure 6C:
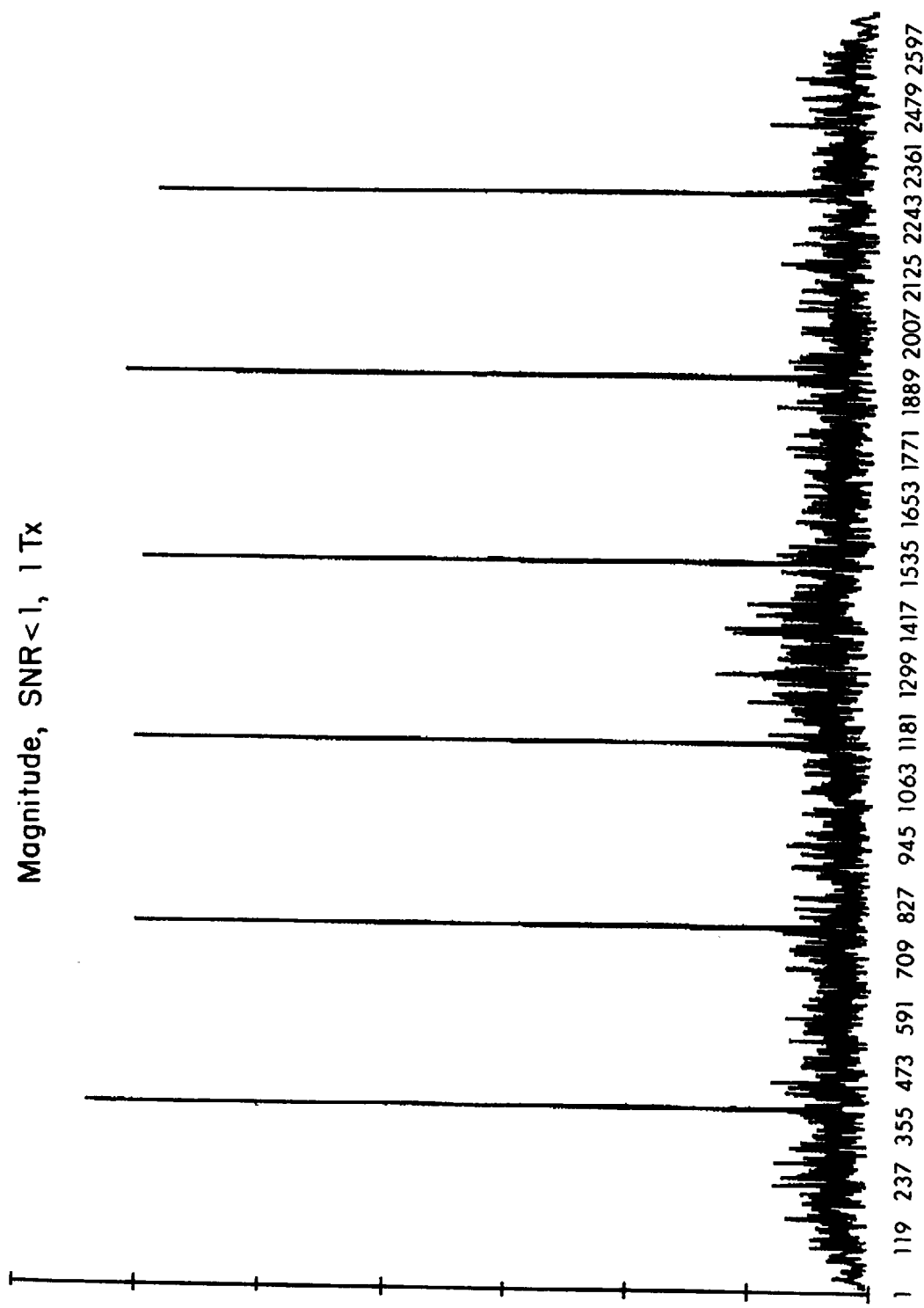
Figure 6D:
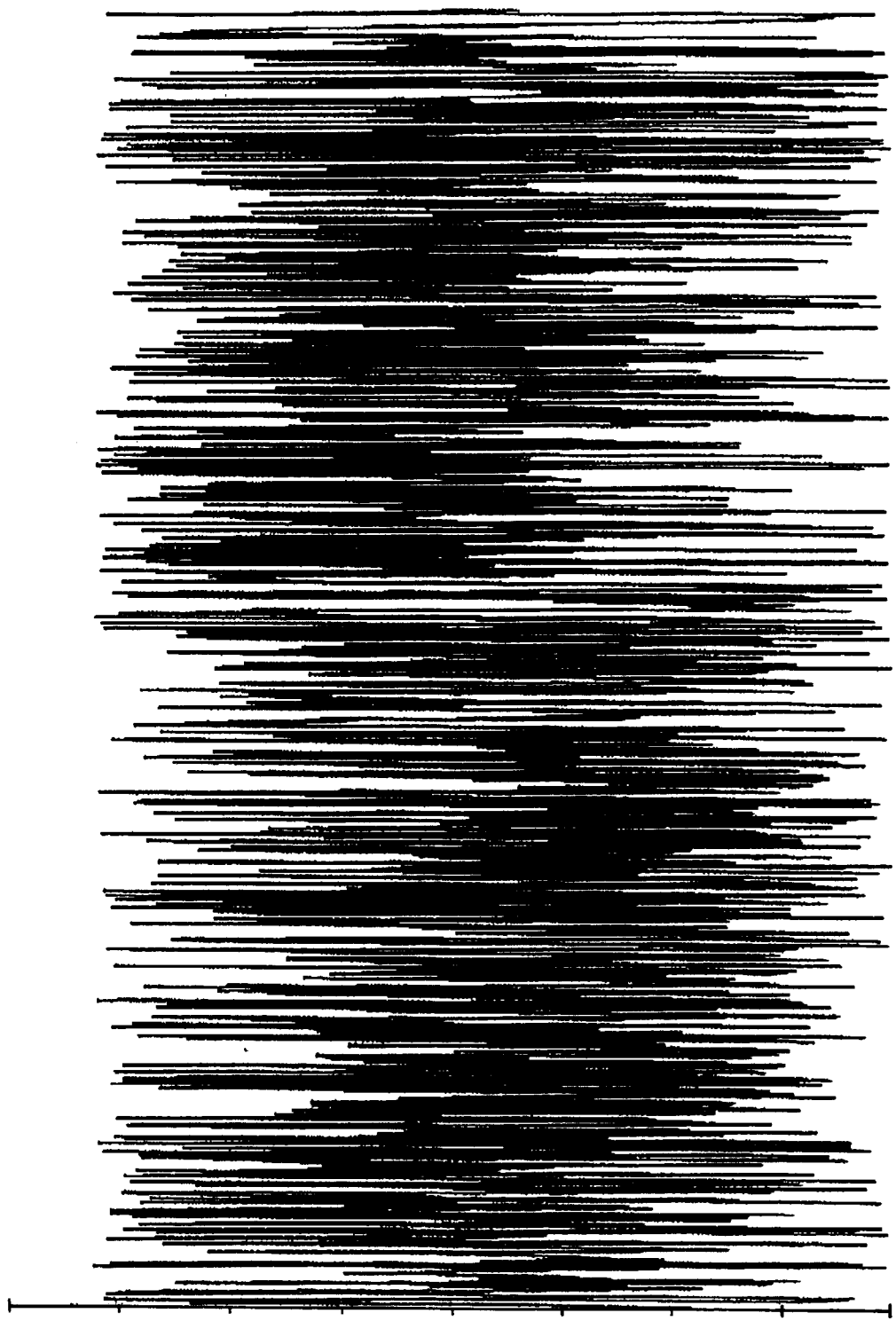

FIGS. 6a and 6b show an actual sampled waveform with noise from the correlation filter output for the I & Q channels respectively, of the double Side Band demodulations. FIGS. 6c and 6d show the magnitude and phase plots respectively for the received data stream generated from the I & Q correlation filter output. Note the low frequency beating present in the I & Q signals due to a frequency mismatch between the transmitter and the receiver carrier signals.

Figure 7:
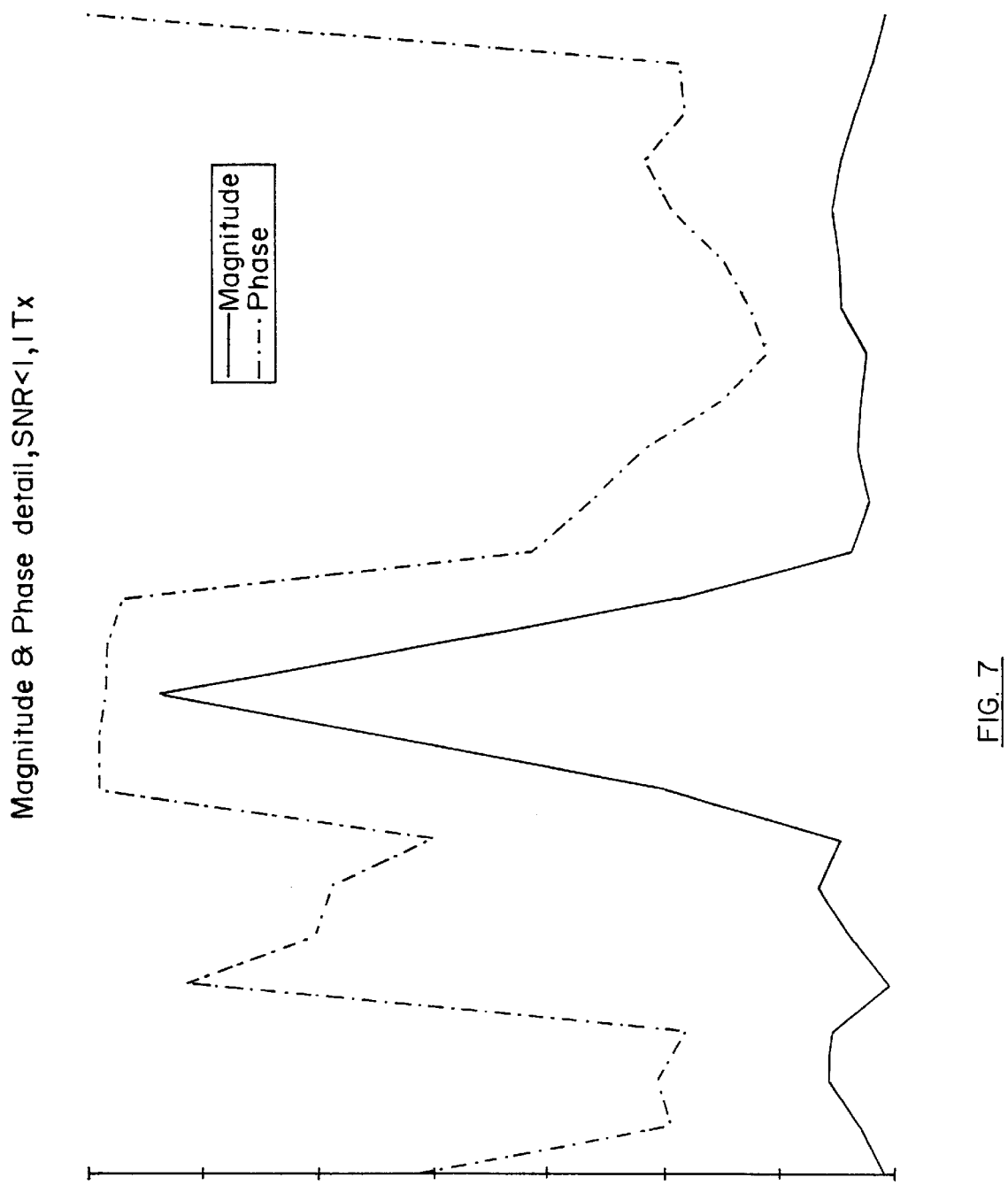
FIG. 7 is an enlarged, superimposed plot of the magnitude and phase of correlational spike "A" of FIG. 6c.
Figure 8A:
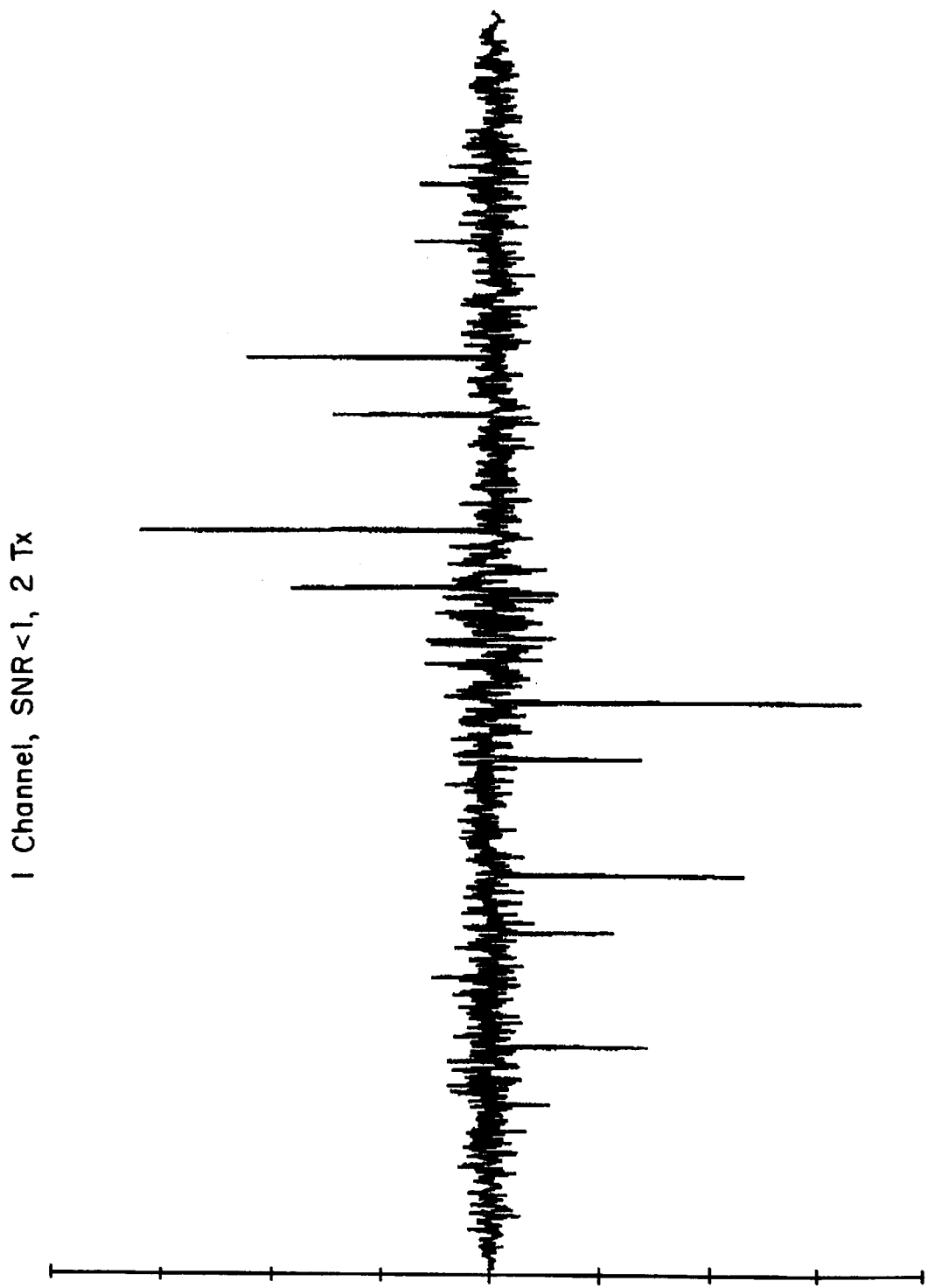
Figure 8B:
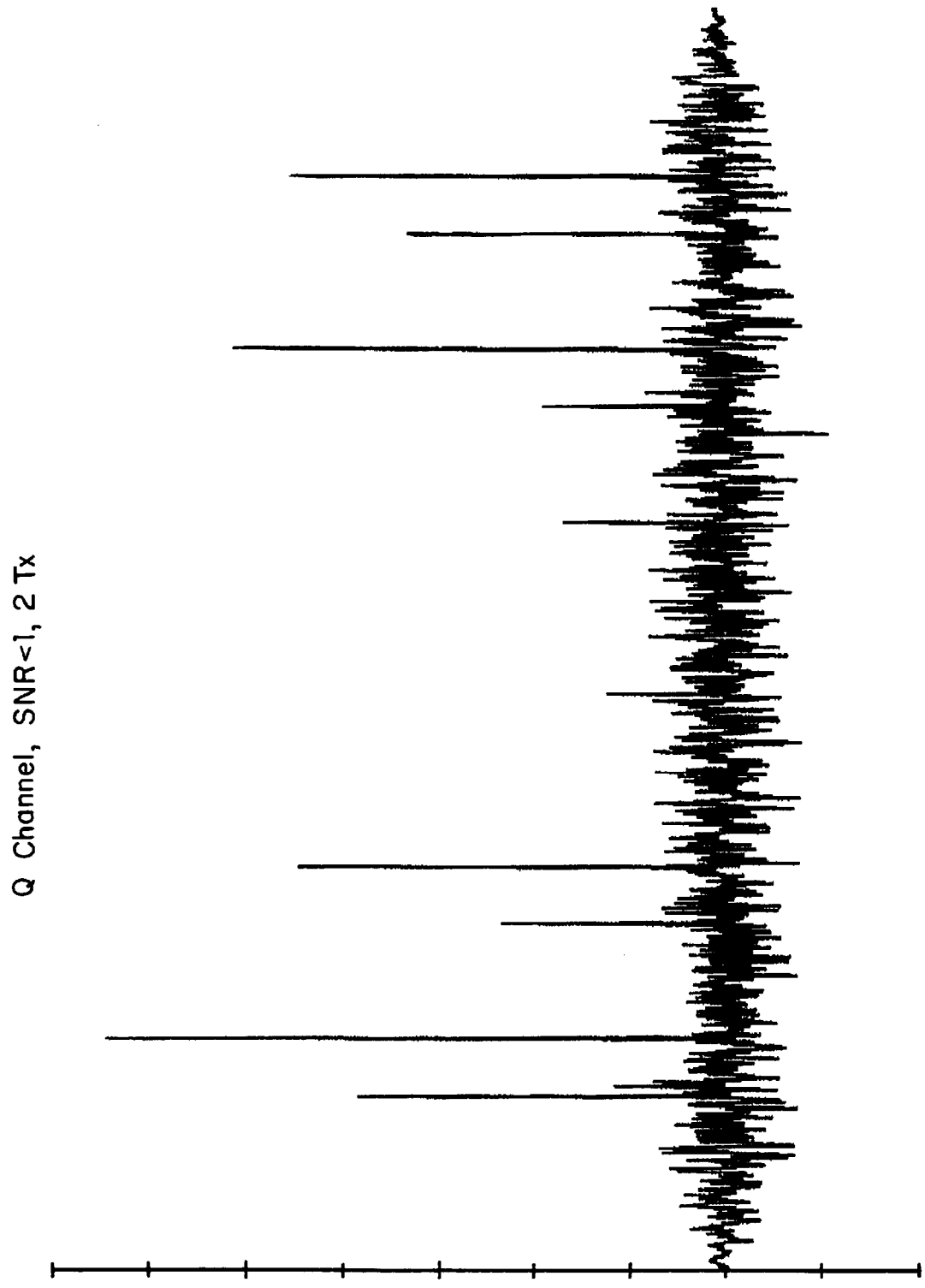
Figure 8C:
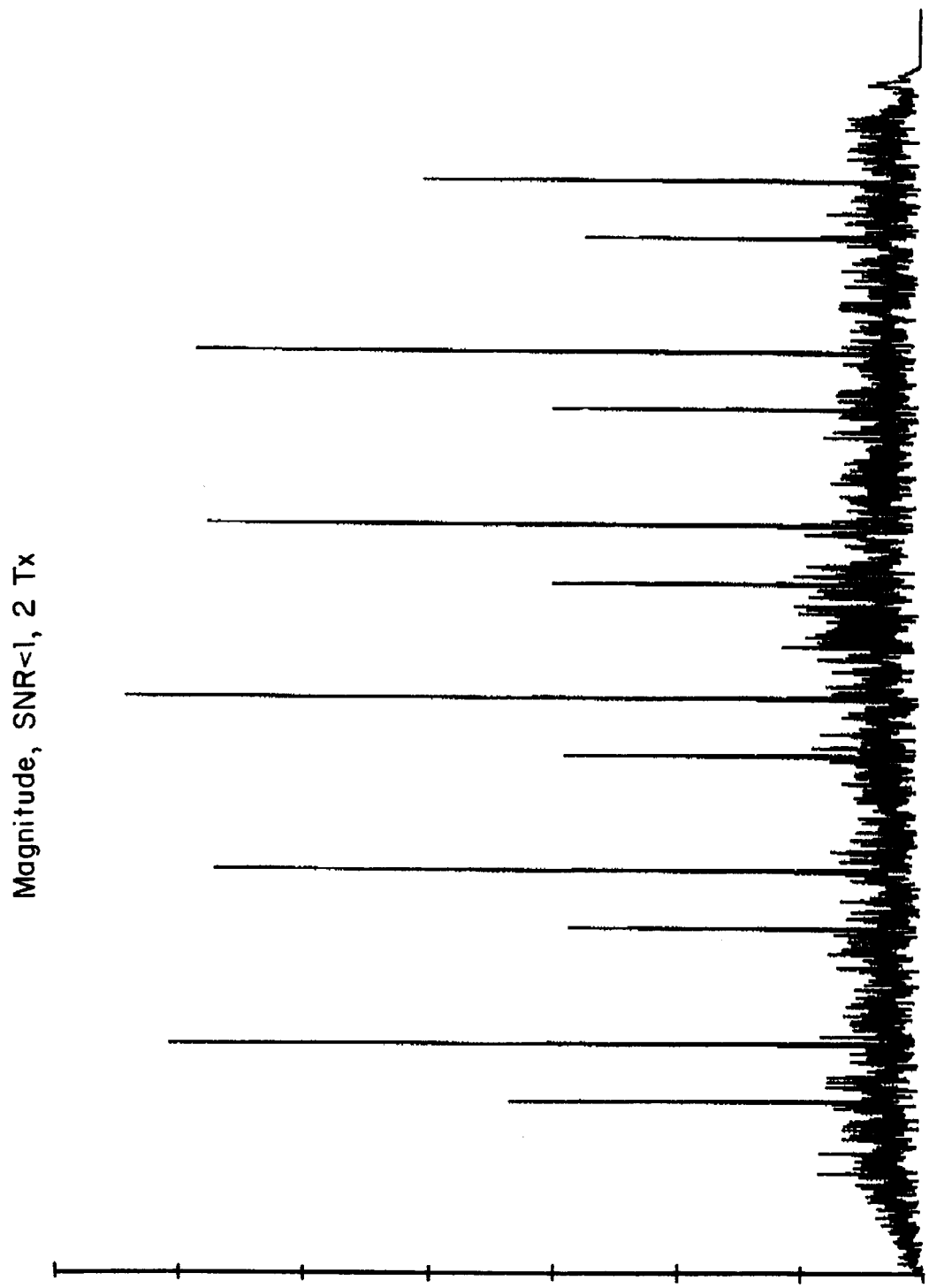

FIG. 7 shows the area around correlational spike "A" in the plot, enlarged for the purpose of closer examination. One can see clearly the frequency difference as evidenced in the non-horizontal phase characteristics of the phase plot during the duration of the spike.

FIGS. 8a–8d show the correlation filter output (I channel, Q channel, magnitude and phase respectively) that demonstrates the simultaneous reception of two signals. This is direct evidence of simultaneous capture of multiple data streams. To understand this capability one just has to realize that for the correlation detector to have a spike for an output that both the waveform shape and phase must match. Thus if multiple PN sequences are received simultaneously, they will each generate a correlational spike. If each input sequence is separated in phase sufficiently to recognize it from its neighbour then each data stream will be recoverable for its data. Correlational outputs for a given data stream are easily grouped as the data bit rate (and its associated correlational spike) repeats every 3 m samples along the length of the correlational output.

A traditional Spread Spectrum Direct Sequence system uses the output from a correlational filter to provide feedback to a phase loop. By doing so the correlational detector can be built less expensively. However, such systems, exhibit a near/far problem and lack of simultaneous capture of multiple data streams referred to generally as lack of capture. The near/far problem arises because a near, and hence stronger, transmitter will get the attention of the detector circuits to the detriment of any weaker transmitters. The lack of capture arises because such a detector system can only lock onto one transmitter at a time.

The next stage in the process forms the magnitude and phase of the incoming data from the following equations:

$$\|C'_n\| = \sqrt{(C'_{n,1})^2 + (C'_{n,2})^2} \quad , \theta_n = \mathrm{Tan}^{-1}\left(\frac{(C'_{n,1})}{(C'_{n,2})}\right)$$

where $C_{n,1}$ and $C_{n,2}$ are correlator outputs for the in-phase and quadrature phase channels respectively.

With respect to signal structure and correlator output, the modulated wave form impressed on the power line is called a bi-phase shift keyed wave form. This means that for a serial data stream, transitions from a logic "1" to a logic "0" and from a "0" to a "1" by a phase shift of 180° (ie. an inversion). Transitions from a "1" to a "1" and from "0"to a "0" do not change the phase. If the two frequencies were identical, each transition (of "1" to "0" and "0" to "1") would be marked with an exact 180° phase change.

With respect to data packet structure details, looking above at the packet definition we can see that each packet begins with a preamble. The purpose of the preamble is to allow detection of the beginning of the packet (this preamble pattern thus has to be distinct).

With respect to packet reconstruction, the packet reconstruction software, consists of a state machine that matches the phase differences for data samples that are spaced 3 m samples apart. Upon finding a series of phase transitions that matches the preamble this state machine simply reassembles the packet by observing the remaining phase transitions every 381 samples along in the data stream for the required number of bits.

In the case where the data contains the same bit pattern as the preamble, a checksum at the end of the packet ensures the validity. Another alternative would be the use of bit stuffing to ensure that the packet pattern cannot exist in the data as is commonly done in other serial protocols.

Transmitter to Receiver Link: System Operating Parameters

With respect to system operating parameters, for this system to operate correctly there are certain constraints placed on the various sub-sections of the transmitter to receiver link that must be met. The first of these constraints is in the total frequency difference between a transmitter and the receiver that is supportable. As mentioned above the beat frequency imposed on the output from the correlational spikes is due to the differing frequencies. As the decoding of the data packet progresses, the relative phase of the correlational spikes of a given packet flip from 0° to 180° in phase. The most that the phase can drift between two correlational spikes is 90° which is half way between these two values. This leads to the relationship:

$$F\Delta < \frac{F_b}{4}$$

Where $F\Delta$=Frequency Difference between transmitter and receiver and $F_b$=Bit rate or frequency of system.

For each bit a full pseudo noise sequence is transmitted and is therefore representative of one whole correlational cycle. By way of an example, in a power line communication implementation of this technology $F_b$=65.6168 (Bits / sec) and the centre frequency is 50 Khz. This represents a total accuracy necessary of 328 parts per million (PPM). There are five possible sources of frequency difference in a transmitter to receiver link. The first is in the transmitter data rate, the second is the transmitter PN rate, the third is in the Transmitter carrier frequency, the fourth is in the receiver carrier source and the fifth is in the receiver ADC sample frequency. With five possible frequency errors, the maximum stability requirements on each source is 66 PPM. Crystals are commercially available that are 50 PPM. Additionally, since in the communication system of the present invention it is envisioned that the receiver may have much more expensive components than the multiple transmitters, the possibility exists for the receiver to be implemented using an oven controlled crystal that has ±0.5 PPM.

Figure 9:
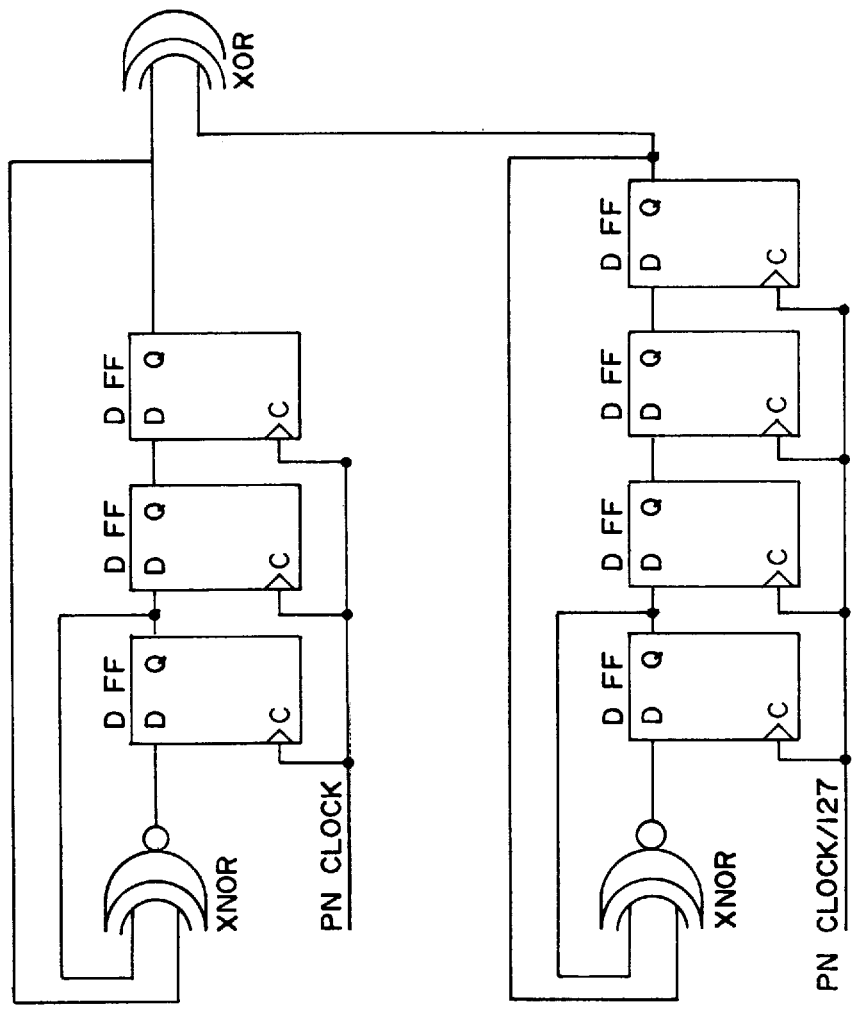
FIG. 9 is a hierarchical PN generator.
Figure 10A:
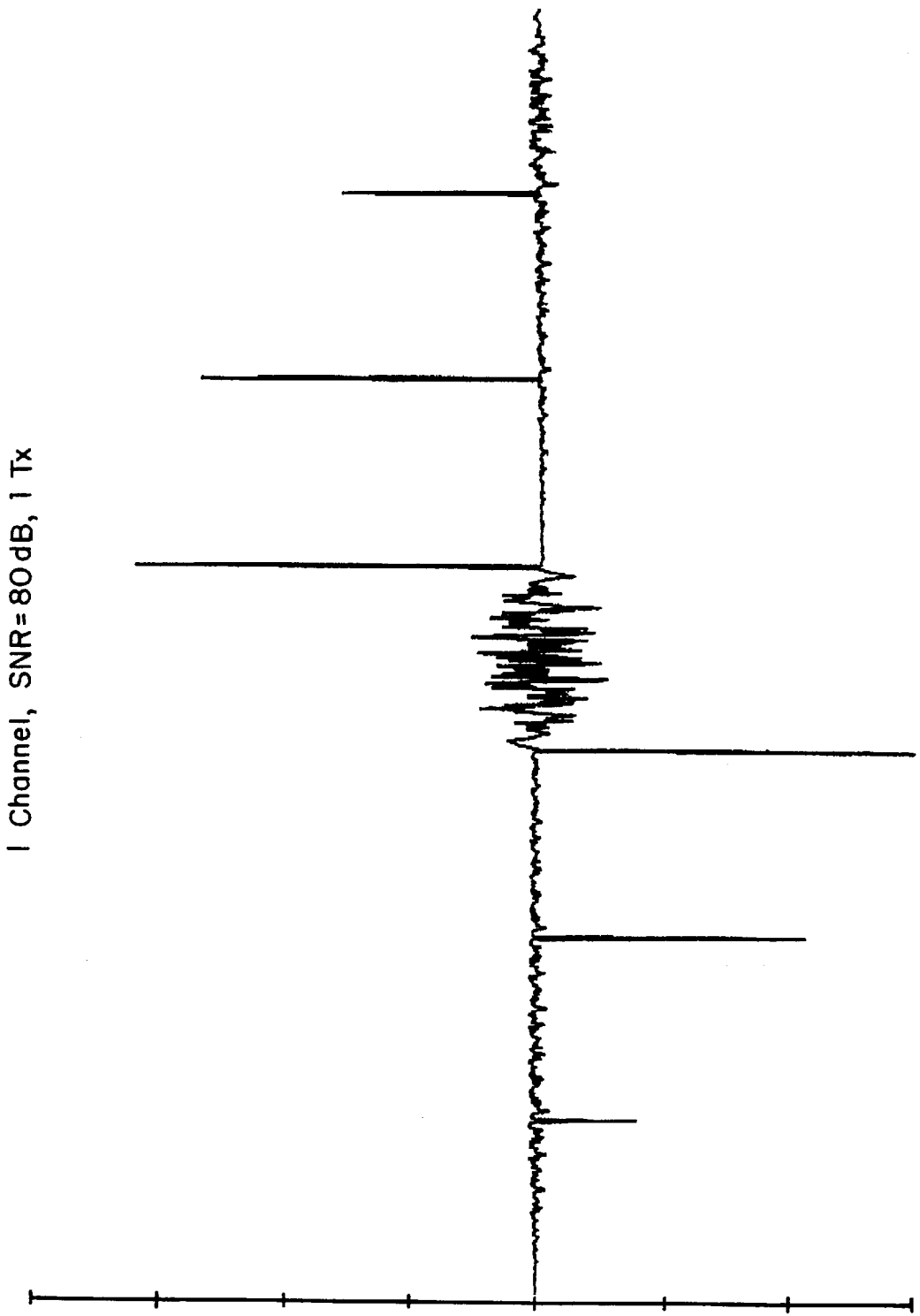
Figure 10C:
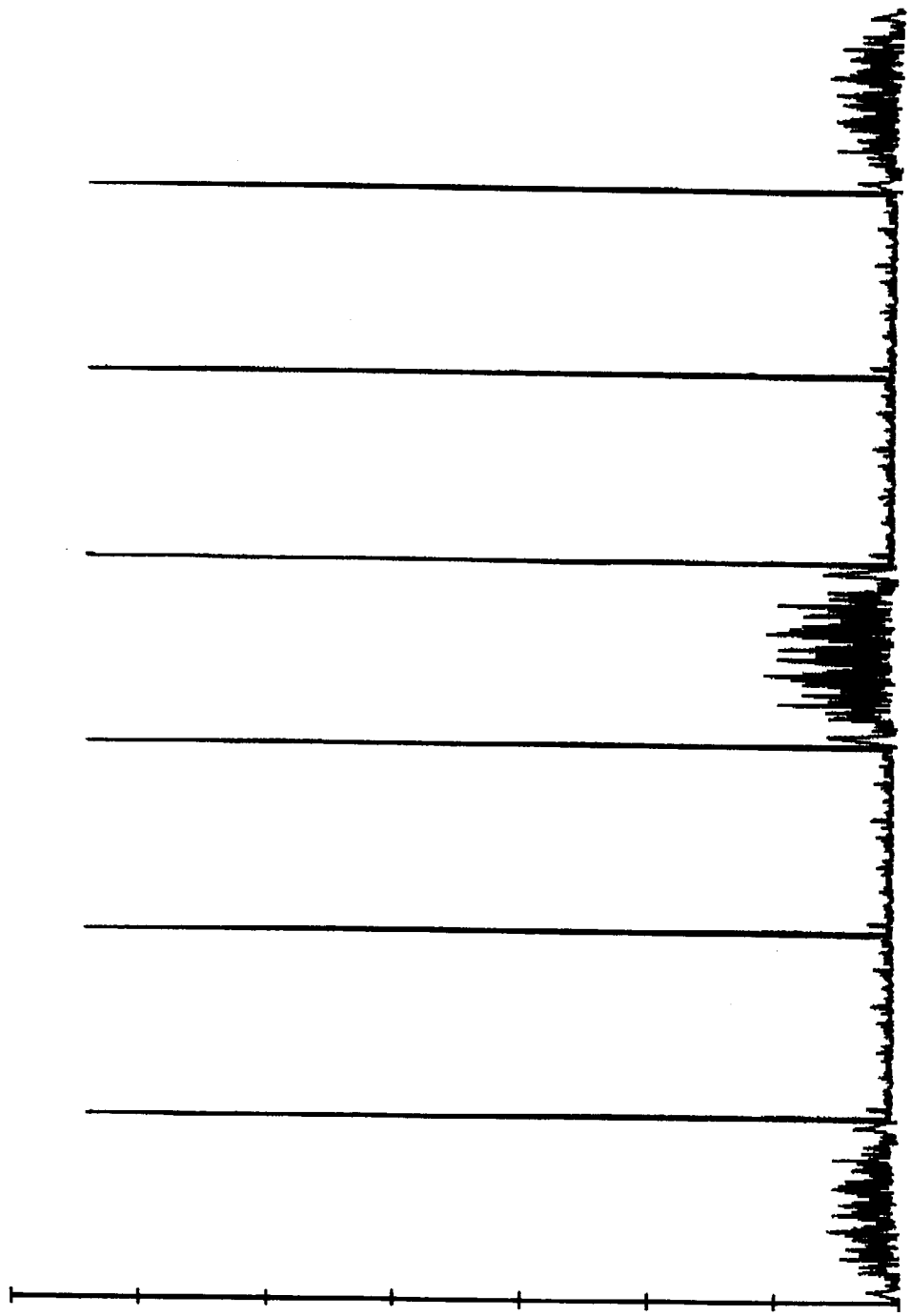
Figure 10D:

For a given frequency difference there will be an upper limit on the centre frequency at which the pseudo noise code may be transmitted. The problem arises because the frequency difference causes a phase drift that could be confused as a 0 bit to 1 bit transition or vice versa. As the bit rate increases or as the PN repeat length increases there is tighter tolerance required of the frequency sources. One way out of this dilemma is to employ a hierarchical PN bit sequence. FIG. 9 shows one embodiment of such a system.

In a hierarchical PN generation scheme the PN generator is replaced with two (or more) PN generators that combine to form the final PN sequence. In the description below is described a two level hierarchical scheme, this can of course be generalized to more than just two levels.

The first PN generator of length L emits a PN sequence of length $2^L-1$. The second PN generator of length K emits PN a sequence of length $2^K-1$. The clock rate of the second generator is run at $$\frac{1}{2^L - 1}$$

the clock rate of the first PN sequence. The two outputs are combined in a XOR gate. For each clock (or chip) of the second PN generator a complete PN sequence of the first generator is emitted. The value of the second PN generator output either inverts or buffers the first PN generator output. The end result is a PN sequence that is composed of a hierarchy of smaller PN sequences.

Detection of the hierarchical PN sequence is accomplished by a correlational filter followed by bit reconstruction, which in turn is followed by a correlational detector and further bit reconstruction. The net effect of this technique is the reduction in repeat length of a given sub-PN sequence. Therefore, the constraints of bandwidth restriction with frequency source accuracy can be relaxed.

The second constraint in this system relates to the analog to digital conversion resolution or the resolution of the receiver front end circuitry up to and including the correlational filters. The resolution of the system must be sufficient to recover the signal including the inherent process gain.

The third constraint relates to a near/far problem. The near/far problem was described previously for traditional Spread Spectrum Direct Sequence systems. This system exhibits a different near/far phenomenon. As illustrated in FIGS. 10a–10d, there is an increase in the background signal level between correlational spikes "B" and "C". This in fact is not noise but an artifact of the correlational process and the impact of a phase transition from a bit change. This effect will limit near/far performance of this system. This effect is dependent upon the phase difference between two individual packets.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A spread spectrum direct sequence communication system comprising:

a plurality of transmitters for uni-directionally simultaneously transmitting through a transmission medium to a single receiver, a plurality of data streams, one data stream for each transmitter in said plurality of transmitters, each data stream comprising a plurality of direct sequence data packets, each transmitter of said plurality of transmitters comprising a data collector, a data formatter, a transmission device, a transmission interface, and a power supply, said data collector for collecting data and passing to said data formatter, said data formatter for formatting said data into a serial data packet comprising a preamble, a transmitter identity and said data, and said data formatter serially shifting said data packet into said transmission device, said transmission device for XOR combination of said data packet with a fixed length, repeated pseudo random noise digital chip sequence at a first clock frequency, and modulation of a resulting pseudo noise signal with a carrier to a carrier centre frequency, said transmission interface transmitting a resulting carrier modulated pseudo noise signal containing said data packet as said data stream from said transmission device into said transmission medium, whereby said data is transmitted at a constant data rate, said signal receiver having a second clock frequency and comprising a linear front-end, a carrier demodulator for simultaneously demodulating a plurality of said carrier modulated pseudo noise signals containing said data packets, means for simultaneous detection of said pseudo noise signals, and means for simultaneous correlation of said pseudo noise signals with a replica of said pseudo noise signal, said single receiver further comprising means for simultaneous reconstruction of said data packets, and means from stripping said data from said data packets once reconstructed.

2. The device of claim 1 wherein, when there is a difference between said first clock frequency and said second clock frequency, said means for reconstruction of said data packets comprises means for compensating for said difference between said first clock frequency and said second clock frequency.

3. The device of claim 1 wherein said data rate is equal to a repeat rate of said fixed length, repeated pseudo random noise digital chip sequence whereby a process gain for said fixed length, repeated pseudo random noise digital chip sequence is maximized.

4. The device of claim 1 wherein said means for simultaneous correlation of said pseudo noise signals with a replica of said pseudo noise signal over-samples said pseudo noise signals.

5. The device of claim 4 wherein said means for simultaneous correlation of said pseudo noise signals with a replica of said pseudo noise signal three times over-samples said pseudo noise signals.

6. The device of claim 1 wherein said means for simultaneous correlation of said pseudo noise signals with a replica of said pseudo noise signal comprises means for performing inner product calculations on said data streams.

7. The device of claim 1 wherein each of said data streams is separated in phase, and said means for simultaneous correlation of said pseudo noise signals with a replica of said pseudo noise signal correlates waveform shape and phase of said data streams with waveform shape and phase of said replica of said pseudo noise signal and generates an indicative output upon a matching correlation.

8. The device of claim 1 wherein said fixed length, repeated pseudo random noise digital chip sequence is a hierarchical pseudo noise bit sequence generated by a plurality of hierarchical pseudo noise generators whose respective output of pseudo noise sequences are XOR'd, whereby said fixed length, repeated pseudo random noise digital chip sequence is formed as a hierarchy of said pseudo noise sequences.

9. The device of claim 8 wherein said plurality of hierarchical pseudo noise generators comprises a first PN generator of length L emitting a PN sequence of length $2^L-1$, at a first clock rate and a second PN generator of length K emitting a PN sequence of $2^K-1$ at a second clock rate, and wherein said second clock rate is $1/(2^L-1)$ said first clock rate.

10. A spread spectrum direct sequence communication system comprising:

a plurality of transmitters for uni-directionally simultaneously transmitting through a transmission medium to a single receiver, a plurality of data streams, one data stream for each transmitter in said plurality of transmitters, each data stream comprising a plurality of direct sequence data packets, each transmitter of said plurality of transmitters comprising a data collector, a data formatter, a transmission device, a transmission interface, and a power supply, said data collector for collecting data and passing to said data formatter, said data formatter for formatting said data into a serial data packet comprising a preamble, a transmitter identity and said data, and said data formatter serially shifting said data packet into said transmission device, said transmission device for XOR combination of said data packet with a fixed length, repeated pseudo random noise digital chip sequence at a first clock frequency, and modulation of a resulting pseudo noise signal with a carrier to a carrier centre frequency, said transmission interface transmitting a resulting carrier modulated pseudo noise signal containing said data packet as said data stream from said transmission device into said transmission medium, whereby said data is transmitted at a constant data rate, said signal receiver having a second clock frequency and comprising a linear front-end, a carrier demodulator for simultaneously demodulating a plurality of said carrier modulated pseudo noise signals containing said data packets, means for simultaneous detection of said pseudo noise signals, and means for simultaneous correlation of said pseudo noise signals with a replica of said pseudo noise signal, said single receiver further comprising means for simultaneous reconstruction of said data packets, and means from stripping said data from said data packets once reconstructed, and wherein said fixed length, repeated pseudo random noise digital chip sequence is a hierarchical pseudo noise bit sequence generated by a plurality of hierarchical pseudo noise generators whose respective output of pseudo noise sequences are XOR'd, whereby said fixed length, repeated pseudo random noise digital chip sequence is formed as a hierarchy of said pseudo noise sequences.

11. The device of claim 10 wherein said plurality of hierarchical pseudo noise generators comprises a first PN generator of length L emitting a PN sequence of length $2^L-1$, at a first clock rate and a second PN generator of length K emitting a PN sequence of $2^K-1$ at a second clock rate, and wherein said second clock rate is $1/(2^L-1)$ said first clock rate.

12. The device of claim 10 wherein, when there is a difference between said first clock frequency and said second clock frequency, said means for reconstruction of said data packets comprises means for compensating for said difference between said first clock frequency and said second clock frequency.

13. The device of claim 12 wherein said data rate is equal to a repeat rate of said fixed length, repeated pseudo random noise digital chip sequence whereby a process gain for said fixed length, repeated pseudo random noise digital chip sequence is maximized.

14. The device of claim 10 wherein said means for simultaneous correlation of said pseudo noise signals with a replica of said pseudo noise signal over-samples said pseudo noise signals.

15. The device of claim 14 wherein said means for simultaneous correlation of said pseudo noise signals with a replica of said pseudo noise signal three times over-samples said pseudo noise signals.

16. The device of claim 10 wherein said means for simultaneous correlation of said pseudo noise signals with a replica of said pseudo noise signal comprises means for performing inner product calculations on said data streams.

17. The device of claim 10 wherein each of said data streams is separated in phase, and said means for simultaneous correlation of said pseudo noise signals with a replica of said pseudo noise signal correlates waveform shape and phase of said data streams with waveform shape and phase of said replica of said pseudo noise signal and generates an indicative output upon a matching correlation.

* * * * *